ly acrylate, among others. The Formula B, of course, will vary generally with the proportions of reactants employed. For instance, when one-half of an equivalent of N-methylglucamine is used per equivalent of methyl acrylate, the product may be represented by the formula

United States Patent Office 2,892,825
Patented June 30, 1959

2,892,825

POLYACRYLAMIDE OBTAINED BY REACTING POLYMETHYLACRYLATE WITH N-METHYLGLUCAMINE AND METHOD OF PREPARING SAME

Fred E. Boettner, Philadelphia, Pa., and Warren D. Niederhauser, Huntsville, Ala., assignors to Rohm & Haas Company, Philadelphia, Pa., a corporation of Delaware No Drawing. Application February 14, 1957
Serial No. 640,068

11 Claims. (Cl. 260—89.5)

This invention deals with water-soluble polyacrylamides as new compositions of matter. It further deals with methods for the preparation of these water-soluble polyacrylamides.

The water-soluble polyacrylamides contemplated in this invention may be represented by the following formulae:

A
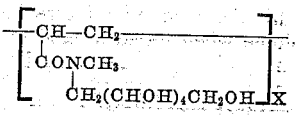

B
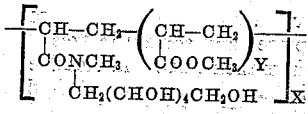

and

C
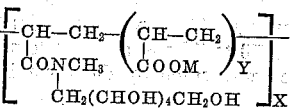

in which X and Y are integers and M is a cation, to be more fully explained hereinafter.

The compounds of this invention, as illustrated by Formulas A and B, are prepared by reacting N-methylglucamine with poly(methyl acrylates) in a manner to be more fully explained hereinafter. Only the poly(methyl acrylates) are suitable for this reaction and other poly-(alkyl acrylates) such as poly(ethyl acrylate), poly-(butyl acrylate), and the like cannot be used. Furthermore, for the purposes of this invention there cannot be used poly(alkyl methacrylates). While it is not certain why the excluded poly(alkyl acrylates) and all of the poly(alkyl methacrylates) do not perform in the same manner as the selected poly(methyl acrylate), it is probably that excessive cross-linking and subsequent insolubilizing occur with the excluded reactants which frustrates the purposes of this invention. It is necessary in order to achieve the purposes of this invention, that is, the preparation of defined water-soluble polyacrylamides, that the polymeric reactant be solely a poly(methyl acrylate).

Compounds of this invention corresponding to Formulas A and B are formed by reacting N-methylglucamine with poly(methyl acrylates) in molecular ratios such that from about 0.1 to about 1.1 equivalents of the N-methylglucamine are present for each equivalent of methyl acrylate with Formula A representing the compounds exhibiting a 1:1 ratio of units and Formula B representing the other ratios. According to Formula B, there may be employed, for instance, one-half of an equivalent of N-methylglucamine per equivalent of methyl acrylate, one-third of an equivalent of N-methylglucamine per equivalent of methyl acrylate, or eight-tenths of an equivalent of N-methylglucamine per equivalent of methyl acrylate, among others. The Formula B, of course, will vary generally with the proportions of reactants employed. For instance, when one-half of an equivalent of N-methylglucamine is used per equivalent of methyl acrylate, the product may be represented by the formula

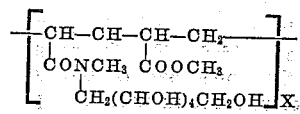

and when one-third of an equivalent of N-methylglucamine is used for each equivalent of methyl acrylate, the product may be represented by the formula

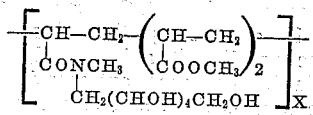

This will serve to illustrate the effect on the formula of the product with variations in Y.

The compounds of this invention represented by Formula C are prepared by reacting N-methylglucamine and poly(methyl acrylate) according to the ratios of Formula B and then hydrolyzing the resultant compound with an alkaline agent having the formula MOH, in which M is preferably ammonium, sodium, potassium, lithium, and the like. In other words the compounds of Formula C are actually the compounds of Formula B hydrolyzed. Since the compounds of Formula C are hydrolyzed compounds of Formula B, what has been said about the compounds of Formula B as to molar equivalents of component parts and values of Y will likewise apply to the compounds of Formula C.

The integer Y will vary as indicated previously in a way that reflects the equivalent proportions of the reacting units present. The integer X will vary generally from about 230 to 4700, but it must be kept in mind that the values of X and Y must be such that the product is water-soluble. The poly(methyl acrylate) reactants that are useful in this invention range in average value molecular weight from about 20,000 to about 400,000.

While it is vital for the present purposes that all of the products be water-soluble polyacrylamides, a differentiation between the compounds of Formula A and Formula B is made merely because they do possess some degrees of differences of properties. For instance, generally, the higher the molecular weight of the polymer reactant the more N-methylglucamine is required to confer water-solubility on the product and conversely. Therefore, lower molecular weight polymer reactants are somewhat more suitable for preparing compounds of Formula B than the higher molecular weight polymer reactants. The important consideration is that the products must be water-soluble. Therefore, it is apparent that one of the principal objects of this invention is to prepare water-soluble polyacrylamides from water-insoluble polymeric compounds and to thereby make products useful for many applications barred to the insoluble polymeric reactants. It is therefore believed clear that Formulas A and B merely represent modifications of the same basic principal of this invention discussed hereinbefore. Compounds represented by Formulas A, B, and C are analogous and similarly useful for the purposes of this invention.

It is necessary to employ an inert organic solvent, preferably of relatively low volatility, in the present reaction. For most advantageous results, both of the reactants should be substantially completely soluble in or miscible with the solvent and be essentially non-reactive with the solvent, particularly the N-methylglucamine. A large excess of solvent is usually preferable, such as from two to ten times the approximate volume of the reactants. Useful as solvents in the present reaction are dimethylformamide, dimethylsulfoxide, dioxane, and the like.

Temperatures in the range of 115° to 155° C. are employed with a range of 120° to 145° C. preferred. Substantially no reaction at all occurs in a reasonable time up to about 110° C. Appreciable reactivity is observed at about 115° C. At temperatures substantially above 155° C. there is a possibility of obtaining undesirable cross-linked insoluble products. Therefore, such temperatures should be avoided. For the most part, when a temperature in the upper part of the defined range is employed, a shorter reaction time is required and conversely. For instance, the reaction is generally complete in no longer than three to four hours when the upper temperature figures are employed, whereas, when the lower temperature range is used, the reaction may require up to about 24 hours for completion. However, the reaction time is not usually critical but merely reflects upon the yields obtained. The important consideration is that the reaction be conducted for a sufficient length of time to permit the formation of water-soluble polymeric product from a water-insoluble polymeric reactant. This means that the reaction should not be conducted for too short or too long a period of time, for in the former instance insufficient water-solubility will be conferred on the product to satisfy the requirements of this invention or in the latter instance the products which have already had sufficient water-solubility conferred upon them may proceed to undesired cross-linking and concurrent insolubilization. Therefore, the standard to be used is not that of an absolute time interval but rather that period of time necessary to confer water-solubility on the product and short of that time when insolubilization might occur. In between these two extremes lie the products of this invention.

Yields in excess of 60 to 70% and above are consistently achieved. A catalytic agent is not required and it is believed that the reaction proceeds so unexpectedly smoothly because of an autogeneous catalytic effect imparted by the amine group of the N-methylglucamine reactant.

If it is desired to make products represented by Formula C from those represented by Formula B, it is only necessary to hydrolyze a compound of Formula B with a sufficient amount of an alkaline agent such as sodium hydroxide, potassium hydroxide, lithium hydroxide, ammonium hydroxide, or the like.

It is possible, if desired, to react a product of Formula B with relatively low molecular weight amines to produce further aminated compounds. Such amines as dimethylamine, dibutylamine, N-methyl-N-propylamine, dimethylaminopropylamine, diethylaminobutylamine, and the like are useful for this purpose.

In order to isolate the product it is possible after a compound of Formula A or B has been formed to pour the reaction mixture into benzene or a mixture of benzene and heptane or the like, which solvent or mixture of solvent, is a non-solvent for the product. The product is removed by filtration and then dried, if desired, by conventional means such as under reduced pressure. In order to isolate the product having the Formula C, it is possible to employ a mixture of cation and anion exchange resins to remove any excess of the alkaline hydrolyzing agent. The ion exchange resins are separated by filtration and the product may be dried, if desired, by conventional means such as under reduced pressure.

The products of this invention are generally white or light colored viscous masses or powders. These products are useful in the textile industry as whiteness retention agents and are superior to carboxymethyl cellulose in that they are stable towards bacteria. These products are valuable in soil-conditioning applications in that they have aggregating activity at least equal to that of commercially acceptable aggregants. For instance, it is quite general for the present products to aggregate to a sufficient particle size from 90 to above 98% of all the particles concerned. The polymeric products of this invention may be used as grease-proofing sizes on paper and are valuable in wet strength resin applications. They are also valuable as thickeners in water-base paints in that they exhibit non-Newtonian viscosity, that is, they exhibit high viscosity at slow stirring rates and low viscosity at high stirring rates.

The compounds of this invention and the method for their preparation may be more fully understood from the following examples which are offered by way of illustration and not by way of limitation. Parts by weight are used throughout.

*Example 1*

There is introduced into a reaction vessel 58 parts of poly(methyl acrylate) having a molecular weight in the range of 20,000 to 25,000 dissolved in 300 parts of dimethylformamide. The reaction vessel is equipped with a mechanical stirrer, a thermometer, and a reflux condenser having a Dean-Stark water trap between the condenser and the vessel. There is then added 133.7 parts of N-methylglucamine with stirring. The reaction mixture is heated to 140° to 145° C. for four and one-half to five hours until the reaction mixture becomes completely water-soluble when tested in cold water. At the end of the heating period, the reaction mixture is cooled to room temperature and poured into 3000 parts of benzene. The product precipitates and is removed from the benzene solution by filtration. The solid product is cut into small pieces and soaked in fresh benzene overnight. The resin is then dried and dissolved in methanol and again precipitated in benzene. It is then dried in a vacuum desiccator. The dried resin product in a yield of 94% had a nitrogen content of 5.1% (theoretical 5.6%). An aqueous 7.2% water solution is clear and has a viscosity of 70 to 75 cps. at room temperature. The product may be represented by the formula

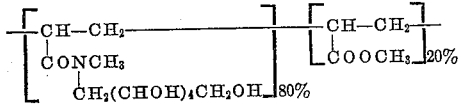

*Example 2*

Into a reaction vessel there is placed 226.5 parts of poly(methyl acrylate) having a molecular weight of 250,000 to 300,000 dissolved in 500 parts of dimethylformamide. There is then added with stirring 101.4 parts of N-methylglucamine. The reaction mixture is heated to 140° to 153° C. for 3 to 4 hours until the reaction mixture becomes completely water-soluble. It is cooled to room temperature and poured in a fine stream with stirring into 3000 parts of benzene. The product is removed from the benzene, cut into small pieces, and soaked overnight in fresh benzene. The resin is removed from the benzene, dried, dissolved in methanol, precipitated again from benzene, and finally dried in a vacuum desiccator. The product had a nitrogen content of 4.7% and corresponded to a product containing about 65% of the N-methyl-N-sorbitylacrylamide and 35% of the methyl acrylate portion of the compound. An aqueous 4.99% water solution of the product is clear and has a viscosity of 65 cps. at room temperature. The product may be represented by the formula

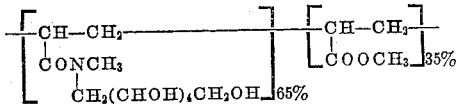

*Example 3*

There is added to a reaction vessel 565 parts of poly(methyl acrylate) having a molecular weight of about 400,000 dissolved in 400 parts of dimethylformamide. A solution of 85 parts of N-methylglucamine in 200 parts of dimethylformamide is added with stirring to the reaction vessel. This mixture is heated at 140° to 150° C. until the product is completely water-soluble (about three and one-half hours). The solution is cooled and poured into 2500 parts of benzene. The product is filtered from the benzene, cut into small pieces, and soaked in fresh benzene. The resin is dried in a vacuum desiccator and corresponds to a yield of 76%. The product has a nitrogen content of 5.1%. In an analogous way there is prepared a similar product by heating the above reactants for eight hours at 125° to 135° C. This product may be represented by the formula

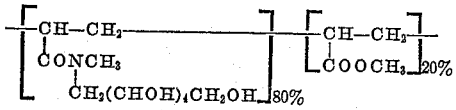

Example 4

The product of Example 2, in the amount of 70 parts, is added to a reaction vessel containing 1130 parts of water heated to 90° C. The reactants are stirred until a solution is observed. The solution is then filtered through a 325 mesh Monel metal screen. There is then added to the solution 6.3 parts of sodium hydroxide dissolved in 106.3 parts of water. Stirring was continued during this addition at room temperature. Shortly after the addition of the sodium hydroxide, the solution becomes noticeably thicker. After stirring the solution for two hours at room temperature, there is added about four parts of a commercial mixture of cation and anion exchange resins to remove any free sodium hydroxide. The reaction mixture is then filtered and the pH of the solution adjusted to 8.0 by the addition of 0.1 N sodium hydroxide. The solution is evaporated to dryness in a stream of air leaving a soft sticky resin which is dried under a high vacuum. The resin product contained 3.46% nitrogen (theoretical 3.43% nitrogen) and corresponds to the following formula:

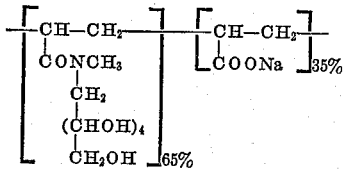

In a similar manner there is prepared the corresponding potassium salt by employing potassium hydroxide in place of the sodium hydroxide.

Example 5

There are added to a reaction vessel 58 parts of poly(methyl acrylate) having molecular weight of 20,000 to 25,000, 700 parts of dimethylformamide and 67 parts of N-methylglucamine. The reaction mixture is heated at 120° to 125° C. for 12 hours at the end of which time the resultant reaction solution is poured into a mixture of benzene and heptane. The product precipitates out of the benzene heptane mixture, is filtered, purified, and dried. The product has a nitrogen content of 4.0% (4.18% theoretical) and corresponds to a product having equal parts of the N-methyl-N-sorbitylacrylamide and methyl acrylate units. The yield is greater than 99%. This product in the amount of 114 parts is dissolved in 1026 parts of water and stirred with 83.5 parts of aqueous 20% sodium hydroxide at room temperature for 20 hours. At the end of this time the solution is stirred with a mixture of cation and anion exchange resins to remove any excess alkali. The ion exchange resins are removed by filtration. The product is isolated by evaporation and drying. The product is recovered as the residue and has a nitrogen content of 4.0% (4.08% theoretical).

We claim:

1. A method for the preparation of water-soluble polyacrylamides which comprises reacting a poly(methyl acrylate) with N-methylglucamine at a reaction temperature in the range of about 115° to 155° C. in the presence of an inert volatile organic solvent and concluding the reaction while a water-soluble product is obtained.

2. A method for the preparation of water-soluble polyacrylamides which comprises reacting a poly(methyl acrylate) with N-methylglucamine in such molecular proportions that about 0.1 to 1.1 equivalents of N-methylglucamine are present for each equivalent of methyl acrylate at a reaction temperature in the range of 115° to 155° C. in the presence of an inert volatile organic solvent and concluding the reaction while a water-soluble product is obtained.

3. A method for the preparation of water-soluble polyacrylamides which comprises reacting a poly(methyl acrylate) with N-methylglucamine in such molecular proportions that substantially one equivalent of N-methylglucamine is present for each equivalent of methyl acrylate at a reaction temperature in the range of 115° to 155° C. in the presence of an inert volatile organic solvent and concluding the reaction while a water-soluble product is obtained.

4. A method for the preparation of water-soluble polyacrylamides which comprises reacting a poly(methyl acrylate) with N-methylglucamine at a reaction temperature in the range of 120° to 145° C. in the presence of an inert volatile organic solvent and concluding the reaction whil a water-soluble product is obtained.

5. A method for the preparation of water-soluble polyacrylamides which comprises reacting a poly(methyl acrylate) with N-methylglucamine at a reaction temperature in the range of 115° to 155° C. in the presence of an inert volatile organic solvent and concluding the reaction while a water-soluble product is obtained and hydrolyzing the water-soluble product with an alkaline agent.

6. A method for the preparation of water-soluble polyacrylamides which comprises reacting a poly(methyl acrylate) having a molecular weight of about 20,000 to about 400,000 with N-methylglucamine at a reaction temperature in the range of 115° to 155° C. in the presence of an inert volatile organic solvent and concluding the reaction while a water-soluble product is obtained.

7. A method for the preparation of water-soluble polyacrylamides which comprises reacting a poly(methyl acrylate) having a molecular weight of about 20,000 to about 400,000 with N-methylglucamine at a reaction temperature in the range of 115° to 155° C. in the presence of an inert volatile organic solvent and concluding the reaction while a water-soluble product is obtained and hydrolyzing the water-soluble product with an alkaline agent.

8. A water-soluble polyacrylamide of poly-methyl acrylate) and N-methylglucamine.

9. A water-soluble polyacrylamide of poly(methyl acrylate) and N-methylglucamine in which there are from 0.1 to 1.1 equivalents of N-methylglucamine for each equivalent of methyl acrylate.

10. A water-soluble polyacrylamide of poly(methyl acrylate), having an average value molecular weight of about 20,000 to about 400,000 and N-methylglucamine in which there are from 0.1 to 1.1 equivalents of N-methylglucamine for each equivalent of methyl acrylate.

11. A hydrolyzed water-soluble polyacrylamide of poly(methyl acrylate) and N-methylglucamine.

References Cited in the file of this patent

UNITED STATES PATENTS

| 2,122,418 | Gladding et al. | July 5, 1938 |
| 2,266,004 | Coes | Dec. 16, 1941 |
| 2,347,494 | Meigs | Apr. 25, 1944 |

FOREIGN PATENTS

| 798,460 | France | Mar. 10, 1936 |